US 6,564,894 B1

(12) United States Patent  (10) Patent No.: US 6,564,894 B1
Ho  (45) Date of Patent: May 20, 2003

(54) POWER TRANSMISSION ARRANGEMENT FOR KICK SCOOTER

(76) Inventor: Chien-Chang Ho, No. 16-2, 35th Rd., Industrial Park, Taichung (TW)

( * ) Notice: Subject to any disclaimer, the term of this patent is extended or adjusted under 35 U.S.C. 154(b) by 0 days.

(21) Appl. No.: 10/046,873

(22) Filed: Jan. 14, 2002

(51) Int. Cl.[7] .............................................. B62D 61/02
(52) U.S. Cl. ........................ 180/228; 180/181; 180/205
(58) Field of Search ................................ 180/180, 181, 180/65.6, 65.1, 205, 227, 228; 280/87.041, 87.021

(56) References Cited

U.S. PATENT DOCUMENTS

| 5,388,659 A | * | 2/1995 | Pepe | 180/219 |
| 5,848,660 A | * | 12/1998 | McGreen | 180/206 |
| 6,273,205 B1 | * | 8/2001 | Tsai | 180/181 |
| 6,338,393 B1 | * | 1/2002 | Martin | 180/227 |
| 6,394,213 B1 | * | 5/2002 | Tsai | 180/181 |
| 6,431,302 B2 | * | 8/2002 | Patmont et al. | 180/228 |
| 6,457,544 B1 | * | 10/2002 | Sung | 180/220 |

* cited by examiner

*Primary Examiner*—Lesley D. Morris
*Assistant Examiner*—L. Lum
(74) *Attorney, Agent, or Firm*—Pro-Techtor International Services

(57) ABSTRACT

A power transmission arrangement for kick scooter is disclosed to include a shock absorbing unit coupled between the footplate and rear wheel of the kick scooter to absorb shocks, an engine unit fixedly mounted on the footplate of the kick scooter, and a transmission unit coupled between the engine unit and the rear wheel for transmitting driving power from the engine to the rear wheel to move the kick scooter, preventing the engine from receiving shocks from the rear wheel during running of the kick scooter.

7 Claims, 4 Drawing Sheets

POWER TRANSMISSION ARRANGEMENT FOR KICK SCOOTER

BACKGROUND OF THE INVENTION

1. Field of the Invention

The present invention relates to power kick scooters and, more specifically, to a power transmission arrangement for kick scooter.

2. Description of the Related Art

Various powered kick scooters have been disclosed, and have appeared on the market. FIG. 1 illustrates a kick scooter power transmission arrangement according to the prior art. According to this arrangement, the engine is fixedly fastened to the rear side of the footplate of the kick scooter, and the output shaft of the engine is fixedly mounted with a driving element, which is directly coupled to the rear wheel for turning the rear wheel to move the kick scooter upon running of the engine. FIG. 2 illustrates another design of kick scooter power transmission arrangement according to the prior art. According to this design, a trans mission belt (chain) is coupled between the drive element at the output shaft of the engine and the driven element at the rear wheel for transmission driving power from the engine to the rear wheel. FIG. 3 illustrates still another design of kick scooter power transmission arrangement according to the prior art. According to this design, a transmission gearbox (or transmission gear set) is coupled to the output shaft of the engine, and a transmission belt (chain) is coupled between the transmission gearbox (or transmission gear set) and the rear wheel.

According to the aforesaid prior art designs, shocks are transmitted from the rear wheel to the engine through the transmission mechanism between the engine and the rear wheel during running of the kick scooter. When the kick scooter moved over an uneven road surface, the engine or parts of the transmission mechanism may be loosened or forced out of place.

SUMMARY OF THE INVENTION

The present invention has been accomplished to provide a power transmission arrangement for kick scooter, which eliminates the aforesaid problem. It is the main object of the present invention to provide a power transmission arrangement for kick scooter, which prohibits transmission of vibrating waves from the rear wheel to the engine during running of the kick scooter. To achieve this and other objects of the present invention, the power transmission arrangement for kick scooter comprises a shock absorbing unit coupled between the footplate and rear wheel of the kick scooter to absorb shocks, an engine unit mounted on the footplate of the kick scooter, and a transmission unit coupled between the engine unit and the rear wheel for transmitting driving power from the engine to the rear wheel to move the kick scooter. This arrangement prevents the engine from receiving shocks from the rear wheel during running of the kick scooter.

DETAILED DESCRIPTION OF THE PREFERRED EMBODIMENT

Figure 1:
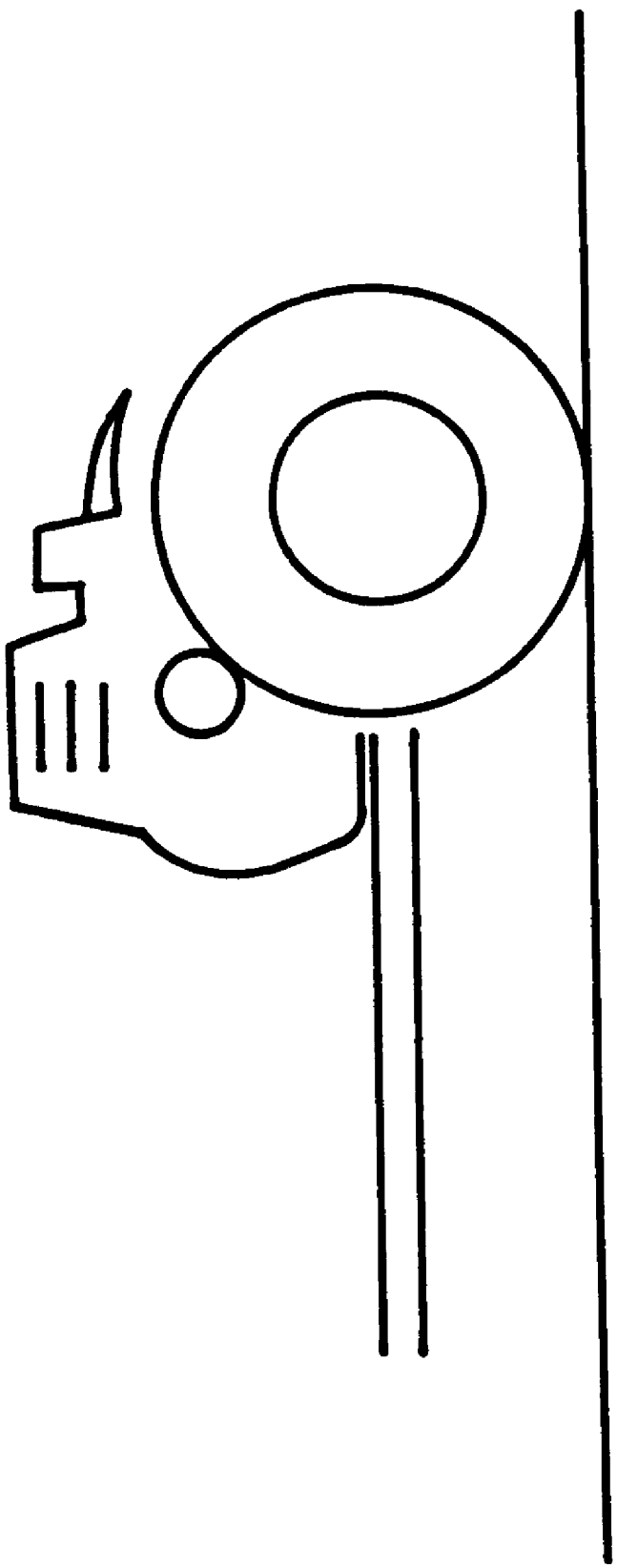
FIG. 1 is a plan view showing a kick scooter power transmission arrangement according to the prior art.
Figure 2:
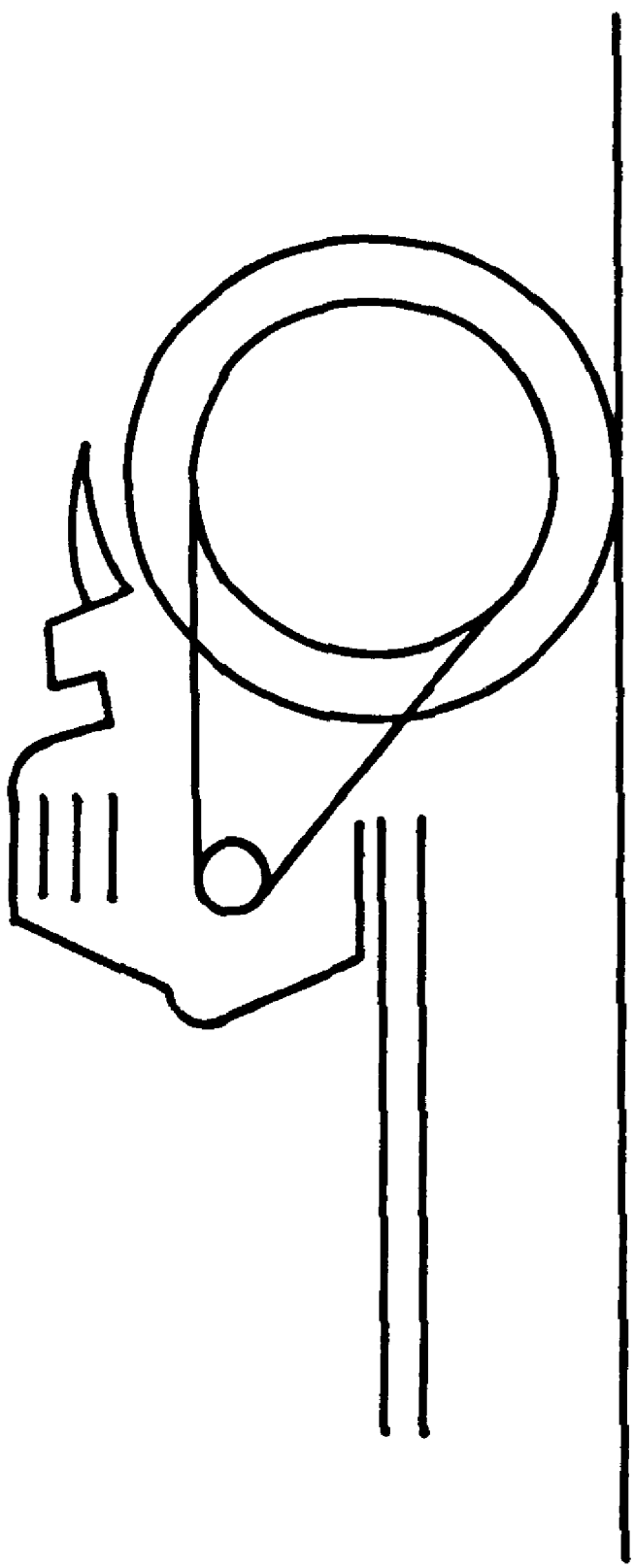
FIG. 2 is a plan view showing another design of kick scooter power transmission arrangement according to the prior art.
Figure 3:
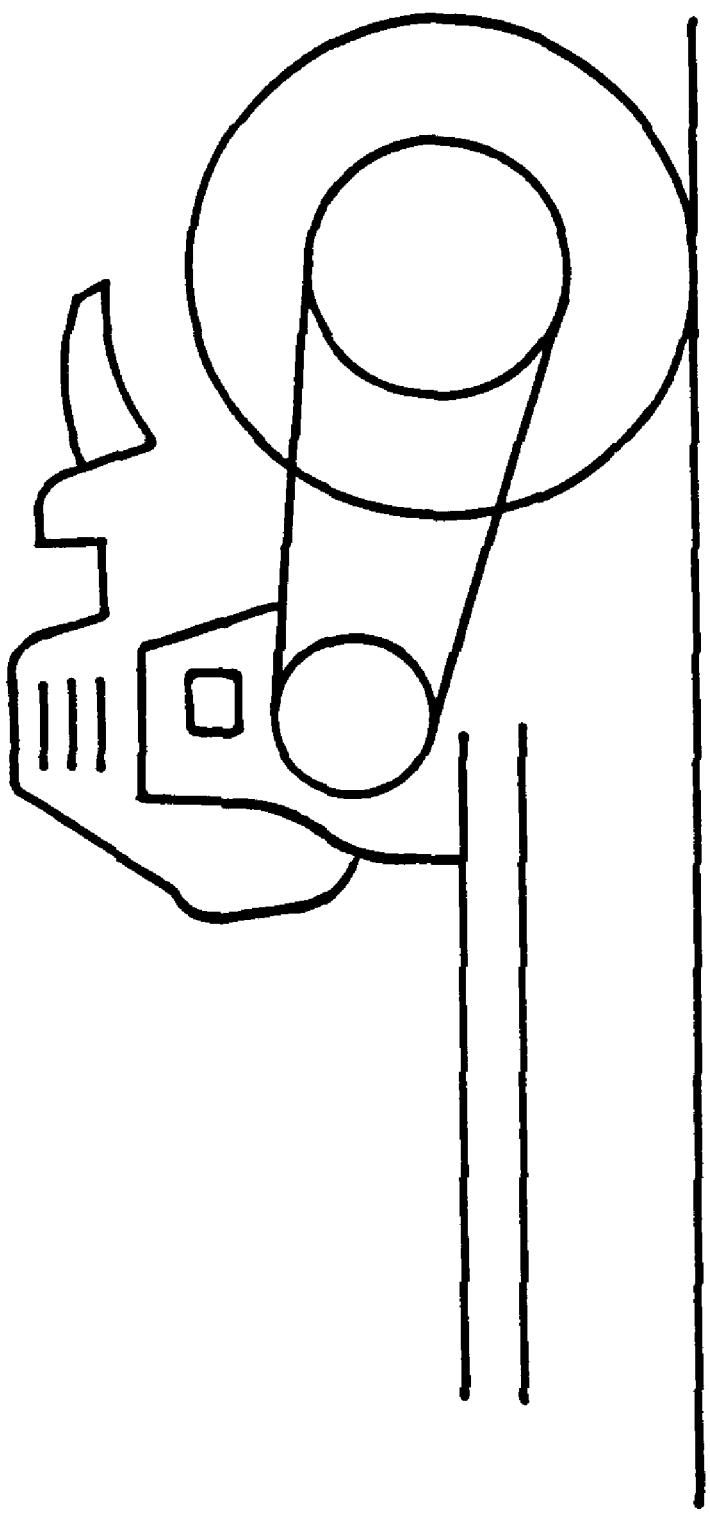
FIG. 3 is a plan view showing still another design of kick scooter power transmission arrangement according to the prior art.
Figure 4:
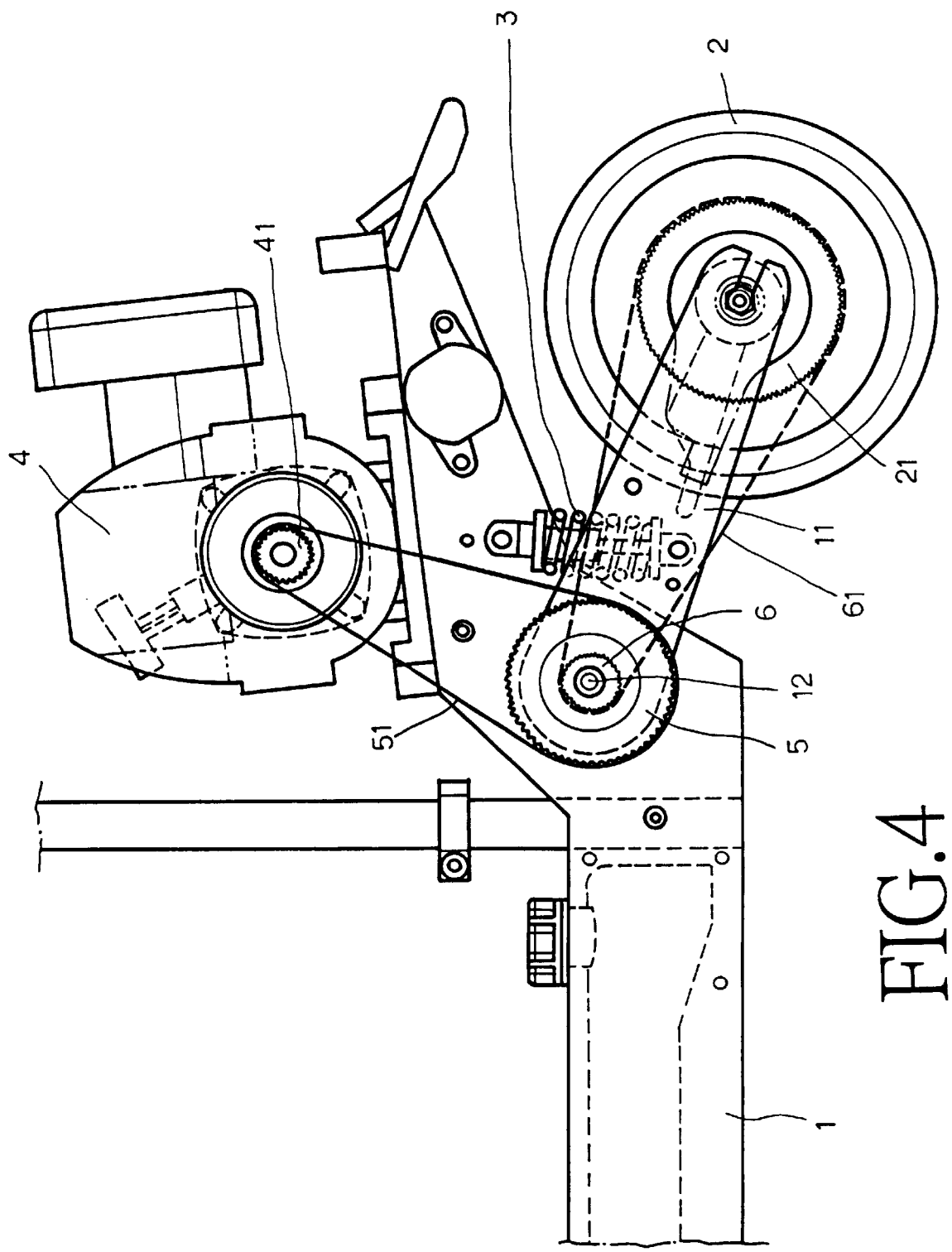
FIG. 4 is a plan view showing a power transmission arrangement for kick scooter according to the present invention.

Referring to FIG. 4, a power transmission arrangement for kick scooter in accordance with the present invention is generally comprised of a shock-absorbing unit, a power unit, and a transmission unit.

The aforesaid shock-absorbing unit comprises a rocker 11, the rocker 11 having a front end pivoted to the rear side of the footplate of the kick scooter 1 and a rear end, a rear wheel 2 pivoted to the rear end of the rocker 1, a follower element 21 fixedly fastened to one side of the rear wheel 2 for synchronous rotation, and a shock absorber 3 coupled between the rear side of the footplate of the kick scooter 1 and a part of the rocker 11.

The aforesaid power unit comprises an engine 4 mounted on the top of the rear side of the footplate of the kick scooter 1, and a drive element 41 mounted on the power output shaft of the engine 4.

The aforesaid transmission unit comprises a main shaft 12 transversely pivoted to the rear side of the footplate of the kick scooter 1, a first driven element 5 fixedly mounted on one end of the main shaft 12, a second driven element 6 fixedly mounted on the other end of the main shaft 12, a first transmission element 51 coupled between the drive element 41 and the first driven element 5, and a second transmission element 61 coupled between the second driven element 6 and the follower element 21.

Referring to FIG. 4 again, when the engine 4 is started, the drive element 41 is rotated with the output shaft of the engine 4 to turn the first transmission element 51, causing it to rotate the first driven element 5, and therefore the main shaft 12 and the second driven element 6 are synchronously rotated with the first driven element 5. Upon rotary motion of the second driven element 6, the second transmission element 61 is driven to rotate the follower element 21 and the rear wheel 2, and therefore the kick scooter I is moved. Because the engine 4, the rear wheel 2, and the shock absorbing unit (the rocker 11 and the shock absorber 3) are separately arranged, the engine 4 does not vibrate when moving the kick scooter 1 over an uneven road surface.

Further, because driving power is transmitted through the first driven element 5 and the first transmission element 51, and the second driven element 6 and the second transmission element 61, the invention achieves a secondary speed reduction effect, enabling engine power to be efficiently transmitted to the rear wheel of the kick scooter.

According to one embodiment of the present invention, the drive element 41, the first driven element 5, the second. driven element 6, and the follower element 21 are toothed belt wheels; the first transmission element 51 and the second transmission element 61 are toothed transmission belts. Alternatively, the drive element 41, the first driven element 5, the second driven element 6, and the follower element 21 can be chain wheels, and the first transmission element 51 and the second transmission element 61 can be chains. Furthermore, the shock absorber 3 can be a hydraulic cylinder, a pneumatic cylinder, an elastomeric member, or a shock absorbing spring.

A prototype of power transmission arrangement for kick scooter has been constructed with the features of FIG. 4. The power transmission arrangement for kick scooter functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A power transmission mechanism installed in a rear side of a footplate of a kick scooter and controlled to move the kick scooter, comprising:

a shock absorbing unit, said shock absorbing unit comprising a rocker, said rocker having a front end pivoted to the rear side of the footplate of the kick scooter and a rear end, a rear wheel pivoted to the rear end of said rocker, a follower element fixedly fastened to one side of said rear wheel for synchronous rotation, and a shock absorber coupled between the rear side of the footplate of the kick scooter and a part of said rocker;

a power unit, said power unit comprising an engine mounted on the rear side of the footplate of the kick scooter, said engine having a power output shaft, and a drive element mounted on the power output shaft of said engine;

a transmission unit, said transmission unit comprising a main shaft transversely pivoted to the rear side of the footplate of the kick scooter, a first driven element fixedly mounted on one end of said main shaft, a second driven element fixedly mounted on an opposite end of said main shaft, a first transmission element coupled between said drive element and said first driven element, and a second transmission element coupled between said second driven element and said follower element.

2. The power transmission arrangement for kick scooter as claimed in claim 1, wherein said drive element, said first driven element, said second driven element, and said follower element are toothed belt wheels; said first transmission element and said second transmission element are toothed transmission belts.

3. The power transmission arrangement for kick scooter as claimed in claim 1; wherein said drive element, said first driven element, said second driven element, and said follower element are chain wheels; said first transmission element and said second transmission element are toothed transmission chains.

4. The power transmission arrangement for kick scooter as claimed in claim 1, wherein said shock absorber is a hydraulic cylinder.

5. The power transmission arrangement for kick scooter as claimed in claim 1, wherein said shock absorber is a pneumatic cylinder.

6. The power transmission arrangement for kick scooter as claimed in claim 1, wherein said shock absorber is an elastomeric member.

7. The power transmission arrangement for kick scooter as claimed in claim 1, wherein said shock absorber is a shock absorbing spring.

* * * * *